United States Patent
Anderson et al.

(10) Patent No.: US 10,219,427 B2
(45) Date of Patent: Mar. 5, 2019

(54) INDEPENDENT CLOSING SYSTEM WITH ADJUSTABLE DOWN FORCE

(71) Applicant: CNH Industrial America LLC, New Holland, PA (US)

(72) Inventors: Brian Anderson, Yorkville, IL (US); Johnathon Dienst, DeKalb, IL (US); Ryan Raetzman, Lemont, IL (US); Marvin Prickel, Homer Glen, IL (US)

(73) Assignee: CNH Industrial America LLC, New Holland, PA (US)

(*) Notice: Subject to any disclaimer, the term of this patent is extended or adjusted under 35 U.S.C. 154(b) by 0 days.

(21) Appl. No.: 15/623,039

(22) Filed: Jun. 14, 2017

(65) Prior Publication Data

US 2017/0280618 A1    Oct. 5, 2017

Related U.S. Application Data

(62) Division of application No. 14/566,933, filed on Dec. 11, 2014, now Pat. No. 9,706,703.

(51) Int. Cl.
  *A01C 5/06* (2006.01)
  *A01C 7/20* (2006.01)

(52) U.S. Cl.
  CPC .............. *A01C 7/205* (2013.01); *A01C 5/066* (2013.01)

(58) Field of Classification Search
  CPC ......... A01C 5/066; A01C 7/205; A01C 7/201; A01C 7/20; A01C 7/00; A01C 5/06; A01C 5/00
  See application file for complete search history.

(56) References Cited

U.S. PATENT DOCUMENTS

| | | |
|---|---|---|
| 4,444,130 A | 4/1984 | Ray |
| 4,805,496 A | 2/1989 | Wagner |
| 5,724,902 A | 3/1998 | Janelle et al. |
| 6,530,334 B2 | 3/2003 | Hagney |
| 7,581,503 B2 | 9/2009 | Martin et al. |
| 7,992,650 B2 | 8/2011 | Landoll et al. |
| 8,275,525 B2 | 9/2012 | Kowalchuk et al. |
| 8,448,717 B2 | 5/2013 | Adams et al. |
| 8,544,398 B2 | 10/2013 | Bassett |
| 8,634,992 B2 | 1/2014 | Sauder et al. |

(Continued)

FOREIGN PATENT DOCUMENTS

CA    2004787 A1    6/1990

OTHER PUBLICATIONS business.kinze.com; WEbsite: http://www.business.kinze.com/objectRepository/.pdf; Row unit operation: pp. 9-1 thru 9-16; Dec. 31, 2009.

(Continued)

*Primary Examiner* — Christopher J. Novosad
(74) *Attorney, Agent, or Firm* — Rebecca L. Henkel; Rickard K. DeMille

(57) ABSTRACT

A furrow closing system for an agricultural seed planter provides soil closing and soil pressing that are controlled by independent adjustable down force or pressure systems that react to a common frame element or backbone. The adjustable down force systems may be manually controlled, electronically controlled and/or part of a closed loop system. A down stop, which may also be adjustable, may be used to limit the maximum force of the adjustable down pressure systems.

6 Claims, 3 Drawing Sheets

(56) References Cited

U.S. PATENT DOCUMENTS

| 9,706,703 B2* | 7/2017 | Anderson | A01C 5/066 |
|---|---|---|---|
| 2012/0210920 A1 | 8/2012 | Bassett | |
| 2012/0255475 A1 | 10/2012 | Mariman et al. | |
| 2013/0032363 A1 | 2/2013 | Curry et al. | |
| 2013/0206431 A1 | 8/2013 | Freed | |

OTHER PUBLICATIONS jsrepair.com; Website:http://www.jsrepair.com/siteart/Manuals/Kinze%20Row%20Unit.pdf; Row Unit Operation; Service Manual; Dec. 31, 2006.
Website: http://jdpc.deere.com/jdpc/servlet/com.deere.u90490.partscatalog.view.servlets.HomePageServlet_Alt?search=catalog&catalog_no=9478&grid_no=A9&page_no=8; John Deere.

* cited by examiner

INDEPENDENT CLOSING SYSTEM WITH ADJUSTABLE DOWN FORCE

CROSS REFERENCE TO RELATED APPLICATIONS

This divisional patent application is based on and takes priority from U.S. patent application Ser. No. 14/566,933, filed Dec. 11, 2014, entitled, "INDEPENDENT CLOSING SYSTEM WITH ADJUSTABLE DOWN FORCE," which is hereby incorporated by reference herein in its entirety.

FIELD OF THE INVENTION

The invention relates generally to agriculture, and in particular, to systems and methods for closing furrows produced during agricultural seed planting.

BACKGROUND OF THE INVENTION

Agricultural seed planters typically produce one or more furrows, or narrow grooves made in the ground, for planting seeds in rows. Upon producing a furrow, the seed planter will typically meter and deposit seeds into the furrow at approximate intervals to balance a maximum number of plants in a planting row with a minimum spacing between plants for optimal growth and harvesting.

Upon depositing seeds in a furrow, seed planters will typically drag soil from behind to close the furrow using a soil closing system. Then, seed planters will typically press the dragged soil downward, onto the covered furrow, using a soil pressing system, in order to maximize contact between deposited seeds and soil and ensure soil stability for plant growth.

Current seed planters have a dependent or semi-independent relationship between soil closing and soil pressing. For example, U.S. Patent Application Publication No. 2013/0206431 A1, titled "Furrow Closing Assembly and Method," describes an arrangement in which a compression spring associated with closing discs reacts against a press wheel swing arm, which, in turn, reacts against a frame via an extension spring. However, due to one component offsetting the other, such seed planters may be less effective in environments having relatively firm soil and therefore requiring relatively high closing forces.

What is needed is a soil closing and pressing system for a seed planter in which adjustment of soil closing does not substantially affect soil pressing, and adjustment of soil pressing does not substantially affect adjustment of soil closing.

SUMMARY OF THE INVENTION

The present inventors have recognized that soil closing and soil pressing may be advantageously controlled by independent adjustable down force systems that react to a common frame element or backbone. The adjustable down force or pressure systems may be manually controlled, electronically controlled and/or part of a closed loop system. A down stop, which may also be adjustable, may be used to limit the maximum force of the adjustable down pressure systems.

Accordingly, soil closing and soil pressing may act independently of one another with each reacting to a common frame element. An adjustable down pressure system, such as a hydraulic or pneumatic cylinder, coil spring, air bag and/or similar device known in the art, may be used to fine tune adjustment. A variety of down pressure systems could be used.

A down stop may be used, for example, to help closing discs from being buried if too much down force is added. With the down stop in place, additional down force can be added to ensure the closing discs can force a trench closed without disrupting the seed in difficult to close soils.

Also, adjustable cylinders may be used to apply force to either one or both of the independent closing components. The use of air or any non-compressible fluid may be used to apply effective force to the particular closing component. The system may use the down stop to help contain the closing systems from being buried when applying higher forces to help close relatively firm soil requiring relatively high closing forces.

The system may allow on the fly adjustments while moving along a ground surface. Also, the system may allow more precise setup adjustments that do not require change with the depth of planting. The down stop may adjustably permit additional force without disrupting the seed in the trench.

A control system may be used to sense and/or adjust either of the adjustable down force systems. The control system may be controlled, for example, by an operator.

Specifically then, the present invention may provide a furrow closing system for an agricultural seed planter which includes: a frame element; first and second adjustable down-force assemblies coupled to the frame element; a closing assembly coupled to the first adjustable down-force assembly; and a press assembly coupled to the second adjustable down-force assembly. The closing and press assemblies may be operable to contact a ground surface with the press assembly approximately following the closing assembly. The first adjustable down-force assembly may be operable to provide a first adjustable down force from the frame element to the closing assembly without substantially affecting the press assembly, and the second adjustable down-force assembly may be operable to provide a second adjustable down force from the frame element to the press assembly without substantially affecting the closing assembly.

Another aspect of the present invention may provide a method for closing a furrow with an agricultural seed planter including a frame element, first and second adjustable down-force assemblies coupled to the frame element, a closing assembly coupled to the first adjustable down-force assembly, and a press assembly coupled to the second adjustable down-force assembly. The method may include: (a) contacting a ground surface with the press and closing assemblies with the press assembly approximately following the closing assembly; (b) adjusting a first down force from the frame element to the closing assembly via the first adjustable down-force assembly without substantially affecting the press assembly; and (c) adjusting a second down force from the frame element to the press assembly via the second adjustable down-force assembly without substantially affecting the closing assembly.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
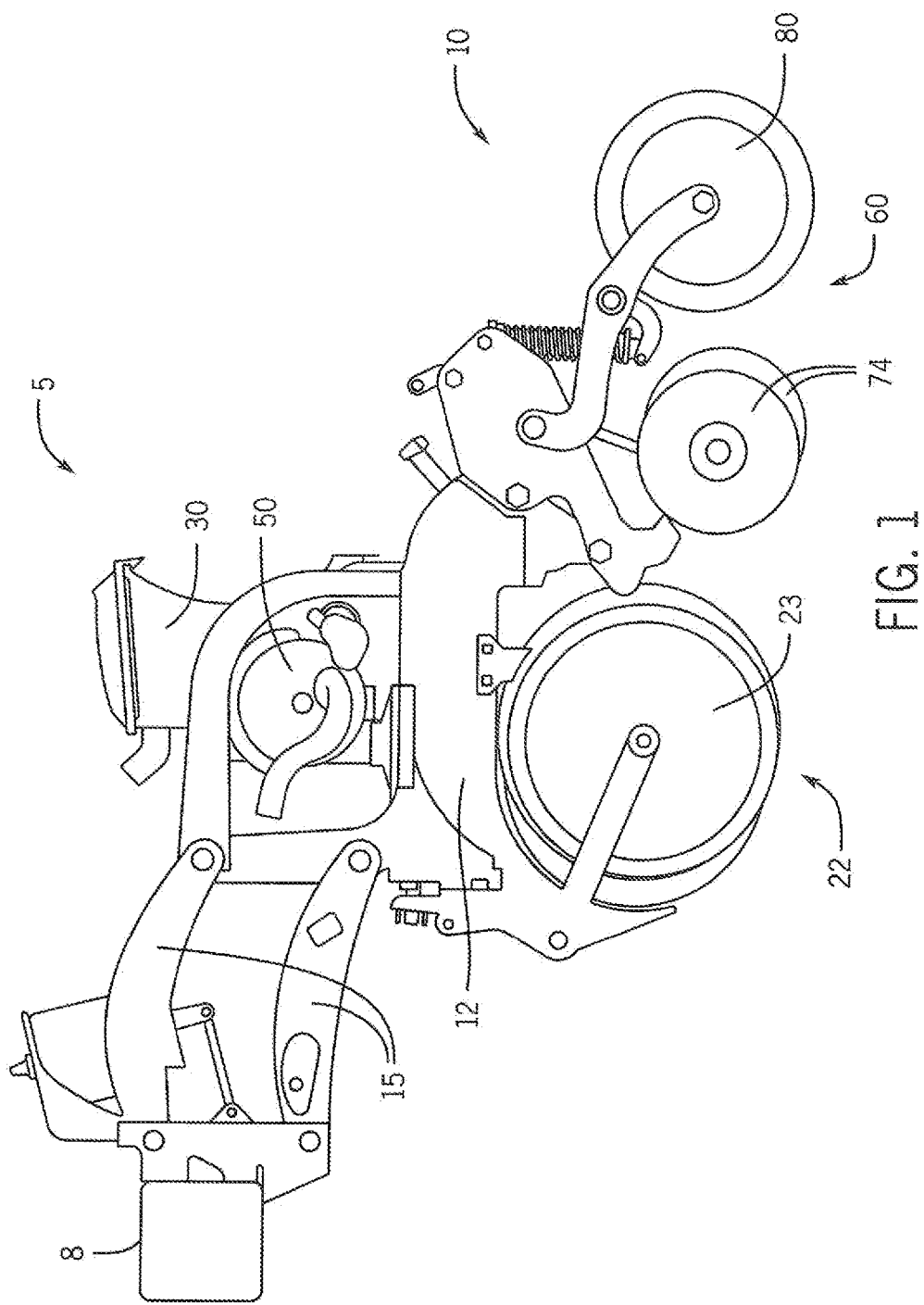
FIG. 1 is a side view of an agricultural seed planter with a conventional furrow closing mechanism.

Referring now to the drawings and specifically to FIG. 1, an exemplar row crop planter implement or seed planter 5 is shown. The seed planter 5 may be pulled by a tractor or other traction device (not shown). The seed planter 5 may include a toolbar 8 that holds multiple individual row planting units 10, each row planting unit 10 being substantially identical. Only a single row planting unit 10 is shown for simplicity.

Row planting unit 10 includes a frame 12 that attaches the row planting unit 10 to the toolbar 8 by way of parallel linkages 15. The frame 12 supports a furrow opening mechanism 22 near a leading end of the row planting unit 10 for cutting open the furrow to receive the deposited seeds. As is known in the art, the furrow opening mechanism 22 includes a pair of lateral spaced furrow opener discs 23. Optionally, the row planting unit 10 can include an opener shoe and/or a runner-type opener for providing a furrow in the ground.

A furrow closing system 60 is illustrated at the opposing end near a trailing end of the row planting unit 10. The closing system 60 may include a pair of furrow closing discs 74 and a closing, packer or press wheel 80. The closing discs 74 are mounted in front of the press wheel 80, such that the two define a fore and aft aligned relationship relative each other. Correspondingly, after the closing discs 74 close the furrow, the press wheel 80 rolls over and tamps the furrow down.

A seed hopper 30 may be mounted atop the frame 12. The seed hopper 30 holds a seed supply for planting by the row planting unit 10. The particular seed hopper 30 shown in FIG. 1 may be adapted and configured to store the seed material and gravitationally deposit the seed material to a seed metering system 50, and ultimately to the ground as the seed planter 5 moves over and across the field in accordance with known procedures.

In some implementations, an optional herbicide or pesticide hopper may also sit atop the frame. The herbicide or pesticide hopper could contain, for example, an herbicide or an insecticide, and may be provided with conventional dispensing means for applying controlled amounts of the contents in the desired locations while using seed planter 5.

Figure 2:
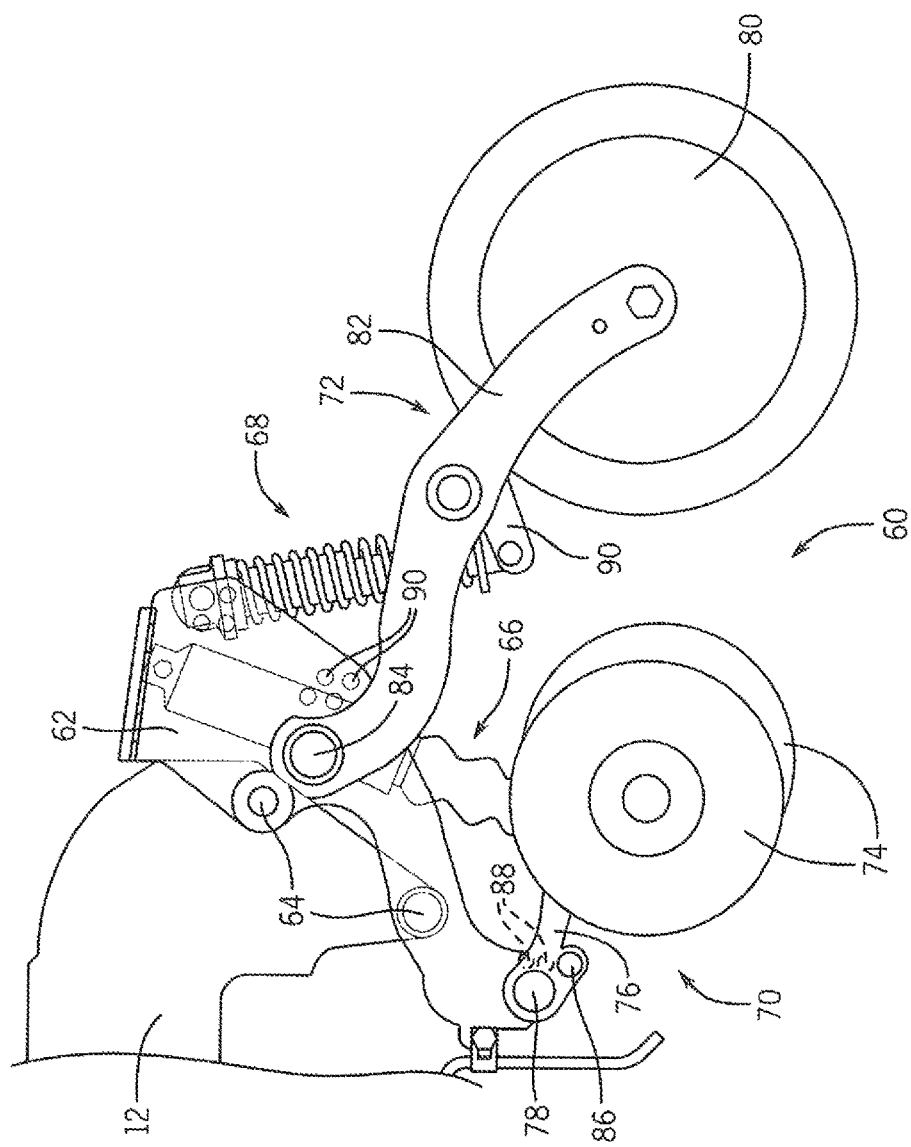
FIG. 2 is a detailed side view of a furrow closing system for an agricultural seed planter in accordance with an embodiment of the present invention.

Referring now to FIG. 2, a detailed side view of the furrow closing system 60 that may be used with the seed planter 5 is provided. A frame element 62 extends from the frame 12. The frame element 62 may be a separate component rigidly attached to the frame 12, such as in the case of adapting to a conventional seed planter, or may be integrally formed with the frame 12. If a separate component, the frame element 62 may rigidly attach to the frame 12, such as via a plurality of bolts 64.

The closing system 60 is an independent closing system with first and second adjustable down-force assemblies 66 and 68, respectively, coupled to the frame element 62. A closing assembly 70 may be coupled to the first adjustable down-force assembly 66, and a press assembly 72 may be coupled to the second adjustable down-force assembly 68. The closing assembly 70 may include the one or more closing discs 74 and a closing arm 76 pivotally coupled to the frame element 62 (via a closing arm pivot point 78) and the closing discs 74. The press assembly 72 may include the packer or press wheel 80 and a press arm 82 pivotally coupled to the frame element 62 (via a press arm pivot point 84) and the press wheel 80.

The closing and press assemblies 70 and 72 may be operable to contact a ground surface with the press assembly approximately following the closing assembly. Accordingly, the closing assembly 70 may be mounted in front of the press assembly 72, such that the two define a fore and aft aligned relationship relative to one another. Correspondingly, after the closing discs 74 of the closing assembly 70 close the furrow, the press wheel 80 of the press assembly 72 rolls over and tamps the furrow down.

The first adjustable down-force assembly 66 may be operable to provide a first adjustable down force from the frame element 62 to the closing assembly 70 without substantially affecting the press assembly 72. Similarly, the second adjustable down-force assembly 68 may be operable to provide a second adjustable down force from the frame element 62 to the press assembly 72 without substantially affecting the closing assembly 70. Accordingly, soil closing, such as by the closing discs 74, and soil pressing, such as by the press wheel 80, may act with forces independent of one another, with both reacting to the common frame element 62.

In operation, adjustment of the first adjustable down-force assembly 66 may result in transferring the first down force to the closing discs 74 by pivoting the closing arm 76. Similarly, adjustment of the second adjustable down-force assembly 68 may result in transferring the second down force to the press wheel 80 by pivoting the press arm 82. Also, appropriate connectors and linkage may be used to accommodate various sizes and fittings, such as linkage assembly 90 connected between the second adjustable down-force assembly 68 and the press assembly 72.

A variety of down pressure systems may be used for the first and second adjustable down-force assemblies 66 and 68, respectively. Accordingly, hydraulic or pneumatic cylinders, coil springs, air bags and/or similar device known in the art, may be used in various combinations to achieve fine tune adjustment. For example, the first adjustable down-force assembly 66 could include a pneumatic cylinder, while the second adjustable down-force assembly 68 may include a hydraulic cylinder disposed through a coil spring. The first and second adjustable down-force assemblies 66 and 68, respectively, may be manually controlled, electronically controlled and/or part of a closed loop system.

Depending on the down pressure systems used, the first and second adjustable down-force assemblies 66 and 68, respectively, may be adjustable in a variety of ways. For example, with a pneumatic cylinder, such as the first adjustable down-force assembly 66, or an air bag system, an air pressure mechanism, which may be manually or electronically controlled, may be actuated to increase or decrease air pressure in the first adjustable down-force assembly 66. Similarly, with a hydraulic cylinder, such as the second adjustable down-force assembly 68, a hydraulic pressure mechanism, which may be manually or electronically controlled, may be actuated to increase or decrease hydraulic pressure in the second adjustable down-force assembly 68.

Similarly, with a coil spring, such as with the second adjustable down-force assembly 68, which may be separate from or in addition to other down-force assembly components, the linkage assembly 90 or similarly connection points may be manually or electronically controlled to increase or decrease tension in the coil spring.

It is contemplated for a down stop 86 to be used to limit the first adjustable down force produced by the first adjustable down-force assembly 66. The down stop 86 may include a bolt, pin or other rigid element inserted into one of a plurality of holes corresponding to positions 88 which limit an angular range of motion of the first adjustable down-force assembly 66 in increasing amounts. Selecting a different position 88 with the down stop 86 may allow selecting a different maximum first adjustable down force to be allowed. As a result, the down stop 86 may help the closing discs 74 from being buried if too much down force is added. With the down stop 86 in place, additional down force can be added to ensure the closing discs 74 can force a trench closed without disrupting the seed in difficult to close soils.

Figure 3:
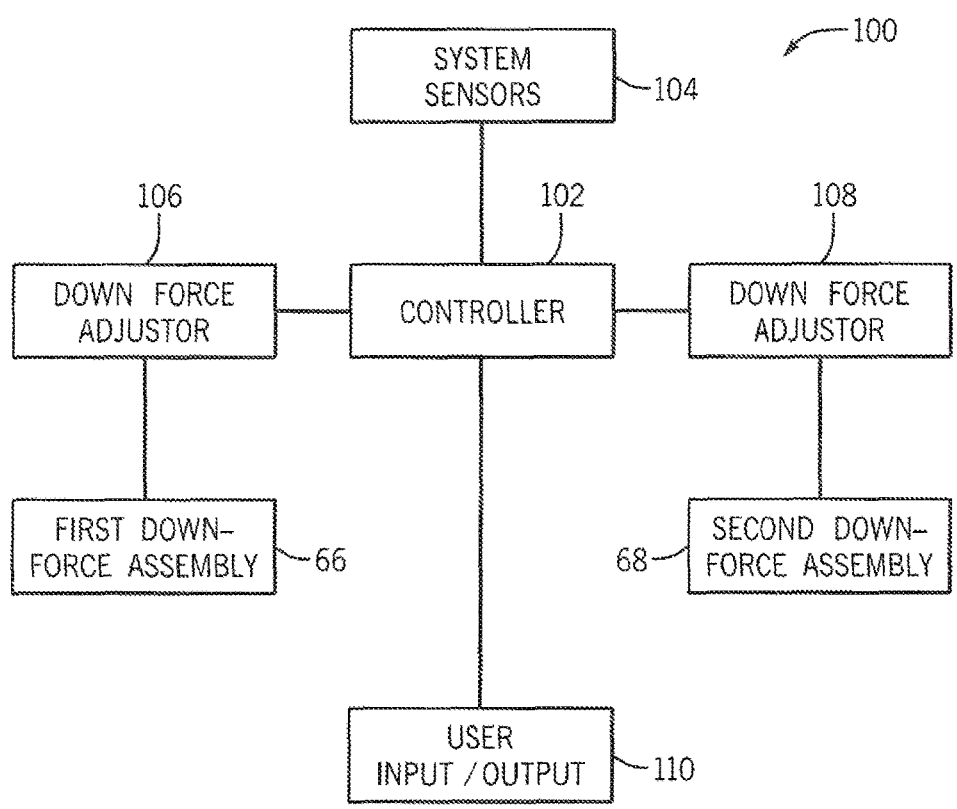
FIG. 3 is a schematic of an electronic control system operable to adjust first and second down-force assemblies for the furrow closing system of FIG. 2.

Referring now to FIG. 3, a schematic diagram of an electronic control system 100 operable to adjust the first and second adjustable down-force assemblies 66 and 68, respectively, for the furrow closing system 60 of FIG. 2 is provided. An electronic controller 102, which may be a processor, a microcontroller or other programmable logic element, may be implemented in the seed planter 5. The controller 102 may optionally receive input from a variety of system sensors 104 also implemented in the seed planter 5, such as one or more of an accelerometer for determining speed, a global positioning system (GPS) for determining location, a gyroscope for determining angles, a temperature, humidity and/or barometric sensor, a timer, and so forth. The controller 102 may also be in bidirectional communication with first and second down force adjustors 106 and 108, respectively, or providing adjustments via valves and pneumatic hoses or hydraulic lines. The first and second down force adjustors 106 and 108, respectively, may each be operable to actuate to increase or decrease a pressure or force in the first and second adjustable down-force assemblies 66 and 68, respectively.

The controller 102 may also be in bidirectional communication with a user input/output (I/O) module 110. The user I/O module 110 may be implemented, for example, via an instrument panel in an operator's cab or other instrument area to allow an operator to monitor the system sensors 104 and/or the pressures or forces of the first and second adjustable down-force assemblies 66 and 68, respectively, as sensed by the first and second down force modules 106 and 108, respectively. Accordingly, the user I/O module 110 may also allow an operator to adjust the pressures or forces in either of the first and second adjustable down-force assemblies 66 and 68, respectively, via actuators of the first and second down force modules 106 and 108, respectively.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A method for closing a furrow with an agricultural seed planter including a frame element, first and second adjustable down-force assemblies coupled to the frame element, a closing assembly coupled to the first adjustable down-force assembly, the closing assembly including a closing arm pivotally coupled to the frame element and at least one closing disc, the closing assembly operable to contact a ground surface, a press assembly coupled to the second adjustable down-force assembly, and a down stop operable to limit the first adjustable down force, the method comprising:
    (a) contacting a ground surface with the press assembly and closing assembly with the press assembly following the closing assembly;
    (b) adjusting a first down force from the frame element to the closing assembly via the first adjustable down-force assembly without substantially affecting the press assembly;
    (c) limiting the first down force via the down stop positioned on the closing arm, the down stop including a plurality of positions providing different limits of the closing arm; and
    (d) adjusting a second down force from the frame element to the press assembly via the second adjustable down-force assembly without substantially affecting the closing assembly.

2. The method of claim 1, comprising the additional step of using an electronic controller to adjust at least one of the first and second adjustable down-force assemblies.

3. The method of claim 1, comprising the additional step of adjusting the first and second adjustable down-force assemblies while the closing and press assemblies are moving along the ground surface.

4. A furrow closing system for an agricultural seed planter comprising:
    a frame element;
    a closing disc operable to contact a ground surface;
    a closing arm pivotally coupled to the frame element and the closing disc;
    a first adjustable down-force assembly pivotally coupled to the closing arm;
    a press wheel;
    a press arm pivotally coupled to the frame element and the press wheel;
    a second adjustable down-force assembly pivotally coupled to the press arm; and
    a down stop limiting a motion of the closing arm, the down stop positioned on the closing arm, the down stop adjustable among a plurality of positions providing different limits of the closing arm,
    wherein the press wheel is operable to contact a ground surface following the closing disc, and
    wherein the first adjustable down-force assembly is operable to provide a first adjustable down force from the frame element to the closing disc without substantially affecting the press wheel, and the second adjustable down-force assembly is operable to provide a second adjustable down force from the frame element to the press wheel without substantially affecting the closing disc.

5. The closing system of claim 4, wherein the first adjustable down-force assembly includes a pneumatic cylinder and the second adjustable down-force assembly comprises a coil spring and a hydraulic cylinder.

6. The closing system of claim 4, further including an electronic controller operable to adjust the first and second adjustable down-force assemblies while the closing disc and the press wheel are moving along the ground surface.

* * * * *